Aug. 1, 1967   W. J. LEE   3,333,705
FILTER
Filed March 7, 1967   2 Sheets-Sheet 1

INVENTOR.
WILFRED J. LEE
BY
Curtis, Morris & Safford
ATTORNEYS

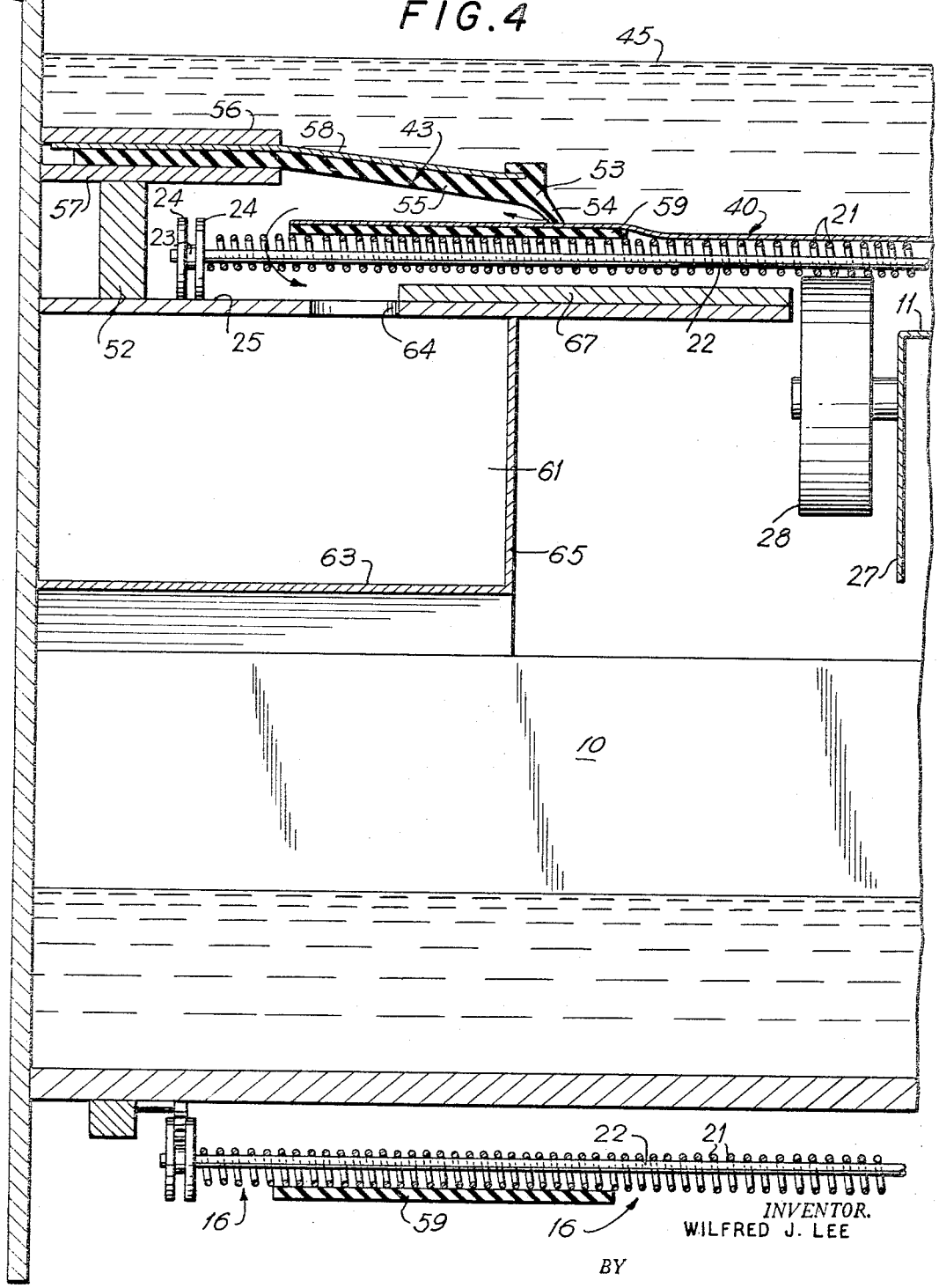

United States Patent Office 3,333,705
Patented Aug. 1, 1967

3,333,705
FILTER
Wilfred J. Lee, East Syracuse, N.Y., assignor to
Belson Corporation, New York, N.Y.
Filed Mar. 7, 1967, Ser. No. 621,223
7 Claims. (Cl. 210—251)

ABSTRACT OF THE DISCLOSURE

A filter device in which a sheet of filter medium is advanced along a perforate bed with sealing strips at the sides to maintain a pool of liquid thereon, troughs at opposite sides for collecting and draining any unfiltered liquid passing through the seals to prevent contamination of filtered liquid.

The present invention relates to filters and more particularly to improvements in filters of the type described and claimed in United States Letters Patent of Charles A. Wallace et al. No. 2,983,383, issued May 9, 1961.

Filters of the type illustrated and described in said patent have a continuous conveyor, such as an interlocking wire mesh, which is driven intermittently in a fixed path around a vessel or tank into which filtered liquid is collected. A sheet of filter medium such as porous paper or cloth is fed onto the upper side of the conveyor for movement therewith and the conveyor is so guided as to form a pool of liquid to be filtered on the top thereof. Sealing strips of a resilient, flexible material engage the sheet of filter medium adjacent its edges to retain the pool of liquid thereon.

Filters of this construction operate quite satisfactorily, but it is difficult to make the sealing strips absolutely leakproof. As a result, some liquid to be filtered is apt to migrate through the sealing strips and find its way into the clean filtered liquid. In most operations, the contamination of the clean filtered liquid by a dirty unfiltered liquid is undesirable and many times unacceptable.

One of the objects of the present invention is to provide an improved construction in a conveyor type filter for segregating any liquid seeping through the sealing strips from the filtered liquid to prevent contamination of the latter.

Another object is to provide a filter of the type indicated in which any liquid seeping past the sealing strips is collected in troughs at the edges of the conveyor and drained into a separate sump for removal from the filter.

Still another object is to provide an improved filter of the type indicated which is of simple and compact construction, economical to manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims:

In the drawings:

FIGURE 4 is a greatly enlarged transverse sectional view taken on line 4—4 of FIGURE 1 to show the relationship of a sealing strip and collecting trough in greater detail.

Figure 1:
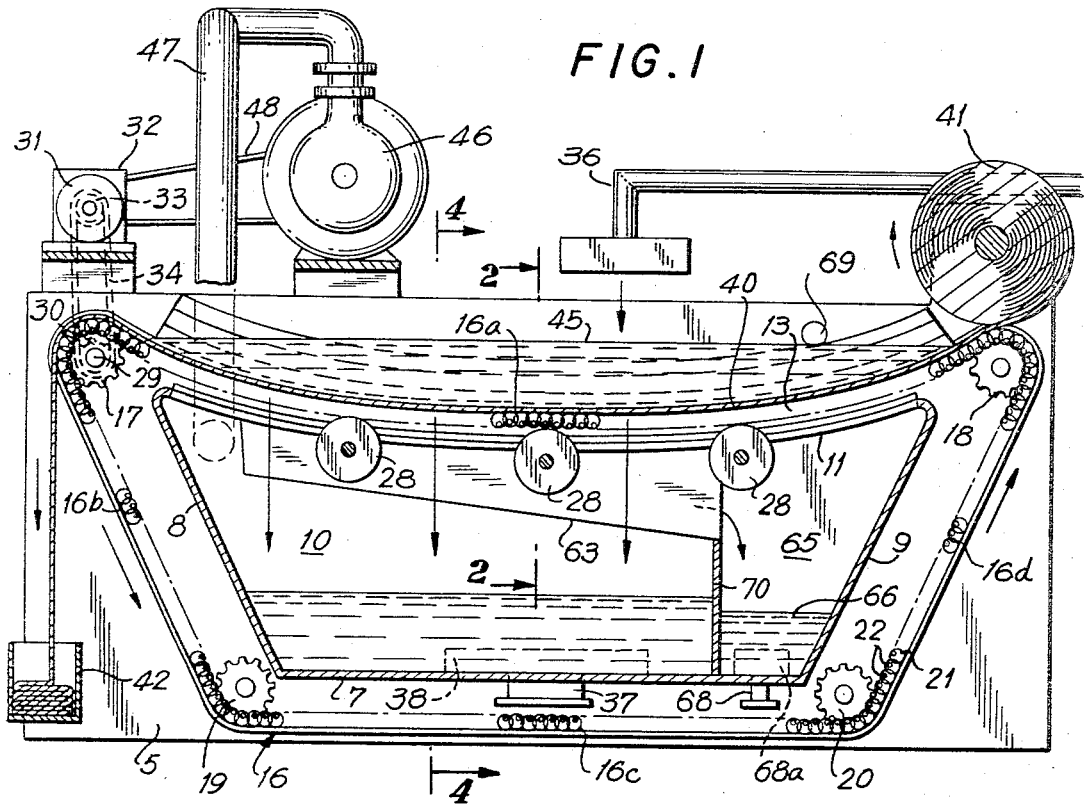
FIGURE 1 is a side elevational view of a conveyor type filter incorpoarting the novel features of the present invention and shown in section to illustrate the path of movement of the conveyor and the location of the sealing strips.
Figure 2:
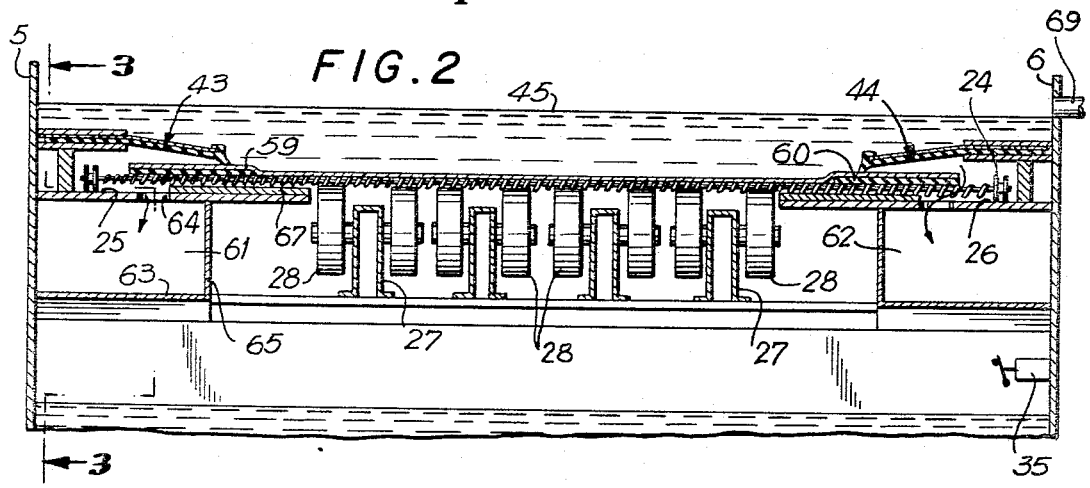
FIGURE 2 is a transverse sectional view taken on line 2—2 of FIGURE 1 to show the troughs underlying the edges of the conveyor and sealing strips for collecting any unfiltered liquid which migrates through the sealing strips.

Referring now to the drawings, FIGURES 1 and 2 illustrate a conveyor type filter to which the present invention is shown applied for purposes of illustration. The filter comprises a frame having side plates 5 and 6 connected by a transverse plate or plates, as by welding, and forming a bottom wall 7 and upwardly inclined end walls 8 and 9 to form a sump tank 10. The top of the sump tank 10 is covered by supporting bed 11 through which liquid can drain into the sump tank. The supporting bed 11 is curved downwardly from its ends to provide a depression 13.

An endless conveyor 16 is mounted on the frame to move around the sump tank 10 and has a top run 16a between sprockets 17 and 18 which rides on the downwardly curved supporting bed 11. A section 16b of the conveyor 16 extends downwardly from sprocket 17 adjacent the end wall 8 of the sump 10 and around a sprocket 19 at the lower left hand end of the tank. From sprocket 19 the conveyor 16 has a horizontal return section 16c under the tank 10 which then turns around sprocket 20, and an end section 16d extending upwardly between sprockets 20 and 18 adjacent the end wall 9 of the sump tank. As shown in FIGURES 1 and 4, the conveyor 16 is in the form of a series of transversely extending spiral wires 21 preferably intermeshed with each other to form a continuous belt. Rods 22 extend through certain of the spiral wires and each rod has ends projecting beyond the ends of the spiral wires. The projecting ends of the rods 22 are connected by links 23 and 24 to provide chains which ride on tracks 25 and 26 projecting inwardly from the side plates 5 and 6 of the filter frame and which follows the contour of the perforated supporting bed 11, see FIGURE 2.

The supporting bed 11, as shown in FIGURES 2 and 4, comprises a plurality of inverted channels 27 arranged in spaced relation with each channel having a pair of depending side flanges on which rollers 28 are mounted at spaced points along the filter to support the conveyor belt 16 laterally and longitudinally on the bed.

Sprockets 17, 18, 19 and 20 are duplicated on each side of the machine and sprockets 17 drive the conveyor 16 and have teeth in meshing engagement with the side chains of the conveyor 16. As shown in FIGURE 1 the sprockets 17 are mounted on a shaft 29 having an end projecting outwardly beyond the side plate 5 and mounting a sprocket 30. A motor 31 is connected to a reduction gear box 32 which, in turn, mounts a sprocket 33 in alignment with the sprocket 30. Sprockets 30 and 33 are connected by a chain 34. Operation of the conveyor 16 is controlled by an adjustable vacuum switch 35 which is subjected to the vacuum in the sump tank 10 and connected to operate a motor 31 to start and stop the conveyor at a certain low pressure differential.

Overlying the top of the sump tank 10 and conveyor 16 is a liquid distributor 36, see FIGURE 1, for dissipating the velocity of the incoming liquids to be filtered and delivering it onto the filter unit; and connected to the side plate 5 of the unit is a discharge pipe 37 depending from a box 38 projecting laterally from the sump tank. Liquid distributor 36 and discharge pipe 37 are part of a fluid circuit, not shown, for circulating the liquid, such as a coolant emulsion, from the filter unit to the work-piece and then back to the filter unit.

A filter medium 40 is illustrated in FIGURES 1 and 4 as a sheet of paper or cloth which is drawn from a roll 41 at the right hand end of the machine, and the sheet of filter medium overlies and is advanced with the conveyor 16. As shown in FIGURE 1, the filter sheet 40 extends along the curved top of conveyor 16 and supporting bed 11. The forward end of the sheet of filter medium 40 and filter cake thereon are discharged into a receptacle 42, as shown in FIGURE 1. Sealing strips 43 and 44 (see FIGURES 2 and 4) of a flexible material are attached to the side plates 5 and 6 with their inner edges overlying the side edges of the sheet of filter medium 40 to seal the joints therebetween. The downwardly curved supporting bed 11 and filter sheet 40 supported thereon through the conveyor 16, together with the curved sealing strips 43 and 44, form a pool 45 of liquid to be filtered which can only escape by passing through the filter medium, or seeping through the sealing strips.

A vacuum pump 46 has its inlet end connected to the sump tank 10 through a conduit 47 and the end of the conduit extends through the side plate 5 for this purpose. Vacuum pump 46 may be driven from the motor 31 through a belt 48 as shown or may be driven by a separate motor. As thus far described, the filter unit is substantially the same as that shown and described in the Wallace et al. Patent No. 2,983,383, referred to above.

In accordance with the present invention, an improved construction is provided to prevent any unfiltered liquid which migrates between the filter medium and sealing strips 43 and 44 from entering tank 10 of filtered liquid. More specifically, troughs are provided at the sides of the conveyor which will receive any unfiltered liquid leaking through the sealing strips, segregate it from the remaining liquid and deliver it to a sump tank where it may be removed.

As shown in FIGURE 4, the track 25 for supporting the links 23 and 24 at one side of the conveyor 16 is in the form of a ledge projecting inwardly from the side plate 5 of the filter frame. Sealing strip 43 is supported from the ledge 25 by a spacer 52 and comprises a follower-head 53 having a rib 54 directly contacting the sheet of filter medium 40 inwardly from its side edge and a laterally extending flange 55. The lateral flange 55 is clamped between plates 56 and 57 at the top of the spacer 52 adjacent the side wall 5 of the filter frame and overlying the flange 55 and head 53 is a strip of spring metal 58 for pressing the rib 54 into yielding engagement with the filter medium 40 at a predetermined pressure. Preferably, the conveyor 16 has a continuous band 59 of a resilient impervious material extending around its periphery for providing a yielding flat surface underlying the filter medium 40 at the location where the rib 54 of the sealing strip 43 engages the filter medium. Thus, seepage or other migration of unfiltered liquid from the pool 45 through the sealing strips 43 is reduced to a minimum. It will be understood that the construction at the opposite side of the filter is identical with that described above comprising a sealing strip 44 of the same construction as strip 43 projecting from side wall 6 and a band 60 of the same construction as band 59.

Figure 3:
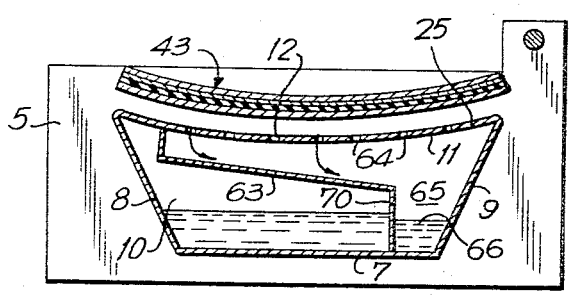
FIGURE 3 is a transverse sectional view taken on line 3—3 of FIGURE 2 to show the inclined bottom wall of one of the troughs to direct unfiltered liquid into a collecting sump.

The troughs 61 and 62 underlying the opposite edges of the conveyor 16 also are of the same construction so that a description of the one trough 61, illustrated in detail in FIGURE 4, will suffice for the other trough 62. Trough 61 is formed by a horizontal wall 63 extending inwardly from the side wall 5 and a vertical wall 65 connecting the inner edge of the horizontal wall to the under side of ledge 25 forming the track for the conveyor links. Ledge 25 has openings 64, such as slots or holes, so that any unfiltered liquid passing sealing strip 43 may move laterally along the top of the filter medium around the side edge of the conveyor 16 and drip on to the ledge 25, but such liquid will then flow through the openings 64 in the ledge and fall into the trough 61 to prevent it from entering the tank 10. As shown more clearly in FIGURE 3, the bottom wall 63 of the trough 61 is inclined along its length and its lower end is connected by a vertical wall 70 to form a sump 66 into which the unfiltered liquid flows. As shown most clearly in FIGURE 4, a second plate 67 is mounted on the ledge 25 inwardly of the openings 64 to form a dam to insure flow of unfiltered liquid through the openings. Thus, the unfiltered liquid is segregated from the liquid in the tank 10 by the walls 63 and 70 and such liquid may be drained from sump 66 through an outlet 68 depending from a box 68a projecting laterally from wall 5. One form of the invention having now been described in detail, the mode of operation is next explained.

For purposes of description, let it be assumed that the filter is in operation with the conveyor 16 being driven intermittently by the motor 31 as controlled by the pressure responsive switch 35 and operating through gear box 32 and chain 34 to move it from the right to the left hand side of the machine as viewed in FIGURE 1. Liquid distributor 36 supplies liquid to be filtered to the pool of liquid 45 between the side plates 5 and 6 and sealing strips 43 and 44. Vacuum pump 46 is operated from the motor 31 through the belt 48, or directly driven by a separate motor, to withdraw air from the interior of the tank 10 and thereby produce a partial vacuum therein. Atmospheric pressure acting on the top of the pool of liquid 45 then forces the liquid through the filter medium 40 which passes through the interlocking wire mesh conveyor belt 16 and the supporting bed 11 and thereafter drips into the tank 10. The filter medium 40 moves with the conveyor belt 16 and filtrate removed from the liquid is collected on the sheet to form a filter cake and the sheet of filter medium with the filter cake thereon is discharged into the receptacle 42.

Any unfiltered liquid which migrates from the pool 45 between the rib 54 of sealing strip 43 or 44 and sheet of filter medium 40 flows laterally along the sheet and underlying impervious belt 59 or 60 and then around the side edge of the conveyor 16 and drips onto a ledge 25. However, all such liquid is prevented from passing into the tank 10 by the dam 67. Instead, such migrating unfiltered liquid drains through the slots or similar opening 64 into the trough 61 formed by the walls 63 and 65 where it is trapped and segregated from the filtered liquid. Such escaping liquid then flows along the inclined bottom wall 63 of the trough 61 and into the sump 66, see FIGURE 3, where it collects. Such dirty liquid is removed from the filter through the drain outlet 68.

It will now be observed that the present invention provides an improved construction in a conveyor type filter for preventing any liquid seeping through the sealing strips from entering the vessel where the filtered liquid is collected. It will further be observed that the present invention provides a filter which segregates any liquid seeping through the sealing strips and delivering it to a sump separated from the tank proper by leak-proof walls. It will still further be observed that the present invention provides a filter of the type indicated which is of simple and compact construction, economical to manufacture and one which is reliable in operation.

While a single embodiment of the invention is herein illustrated and described, it will be understood that changes may be made in the construction and arrangement of elements without departing from the spirit or scope of the invention. Therefore, without limitation in this respect, the invention is defined by the following claims.

I claim:

1. In a filter of the type having a movable perforate conveyor, means cooperating with said conveyor to form a pool of liquid to be filtered on the top thereof, a sheet of filter medium on said conveyor and movable therewith, a vessel underlying said filter medium for receiving liquid passing therethrough and means comprising sealing strips at opposite sides of the pool and engaging the sheet of filter medium in said pool, that improvement comprising, troughs underlying the edges of said conveyor outwardly from said sealing strips to receive any liquid migrating through the sealing strips and segregating it from the filtered liquid in said vessel.

2. A filter having side walls, a perforate endless conveyor, means supporting said conveyor between said side walls to form a pool of liquid supplied to the top thereof, means for moving said conveyor along its supporting means, a sheet of filtering medium mounted on and movable with the top course of said conveyor, sealing means having resilient strips extending from opposite side walls and engaging the sheet of filter medium adjacent to and inwardly from its opposite side edges to retain the liquid to be filtered in said pool, walls forming a tank underlying the conveyor and filter medium, and additional walls forming troughs underlying the edges of the conveyor outwardly from the sealing strips to collect any liquid seeping through said strips.

3. A filter in accordance with claim 2 in which the conveyor comprises interconnected wire mesh, and said sealing means comprising continuous bands at each edge of the conveyor overlying the wire mesh, the edge portions of said sheet of filter medium overlying the continuous bands and cooperating with the sealing strips extending from the said walls to engage the sheet therebetween.

4. A filter in accordance with claim 2 in which the trough formed by the walls at each side of the conveyor extend throughout the length of the pool of liquid, and the bottom wall of said troughs being shaped to drain liquid toward one end and form a sump for collecting the seeping liquid.

5. A filter in accordance with claim 2 in which the conveyor comprises intermeshing spiral wire coils, ledges extending inwardly from the side walls to support the ends of the connected coils as they move in a continuous path, said walls forming the troughs underlying the ledges, and said ledges having openings through which liquid may flow into the troughs.

6. A filter in accordance with claim 5 having shafts extending between the side walls, sprockets on said shafts intermeshing with said conveyor, and means for driving one of said shafts to move said conveyor in a continuous path around the walls forming the tank and troughs.

7. A filter in accordance with claim 2 in which the tank has a pervious top, the filter medium and sealing strips overlying the top of the tank, and means for producing a partial vacuum in said tank to cause liquid from said pool to flow through the filter medium and into said tank.

References Cited
UNITED STATES PATENTS

| | | | |
|---|---|---|---|
| 2,619,232 | 11/1952 | Parsons et al. | 210—400 |
| 2,983,383 | 5/1961 | Wallace et al. | 210—97 |

SAMIH N. ZAHARNA, *Primary Examiner.*